Dec. 17, 1963   L. C. GRAY ETAL   3,114,532
PILOT TYPE SOLENOID VALVE
Filed Aug. 12, 1960

LEGEND:
- ▦ COIL
- ▩ NON MAGNETIC MATERIAL
- ▨ } MAGNETIC MATERIAL
- ▪

LOWELL C. GRAY
LEON H. BISHOP
INVENTORS

BY *Robert C. Smith*

ATTORNEY

United States Patent Office 3,114,532
Patented Dec. 17, 1963

3,114,532
PILOT TYPE SOLENOID VALVE
Lowell C. Gray and Leon H. Bishop, South Bend, Ind.,
assignors to The Bendix Corporation, South Bend, Ind.,
a corporation of Delaware
Filed Aug. 12, 1960, Ser. No. 49,227
3 Claims. (Cl. 251—30)

This invention relates to solenoid operated valves and more particularly to arrangements in which a solenoid operates a pilot valve which, in turn, operates a control valve.

Many electrical and hydromechanical control systems, especially for aircraft, require the use of small and compact control valves for controlling rather large fluid pressures by electrical means. In many applications it has been found that the fluid pressures encountered and the size of the control valve required is such that direct operation of the control valve by the solenoid requires a winding of excessive size and weight. Because of this problem means have been proposed in which the solenoid operates a pilot valve and this pilot valve, making use of the hydraulic pressure available, operates the larger control valve. Such arrangements have permitted some reduction in the size of the solenoid but have introduced new problems in coordinating effective travel of of the solenoid and its pilot valve with that of the main valve. It is therefore an object of the present invention to provide a pilot type solenoid operated valve structure in which the size of the solenoid can be appreciably reduced from that of currently available types by providing means for making the stroke of the solenoid entirely independent of the control valve.

Another object of the present invention is to provide a pilot type solenoid operated valve in which means are provided which permit separate adjustment of the pilot valve stroke irrespective of the stroke of the control valve.

It is another object of the present invention to provide a pilot type solenoid operated valve in which compensation may be made for changes in the effective stroke of the control valve without requiring the replacement of parts.

A further object of the present invention is to provide arrangements for pilot type servo operated valves in which substantially interchangeability of parts may be effected between normally closed and normally open configurations.

Figure 1:
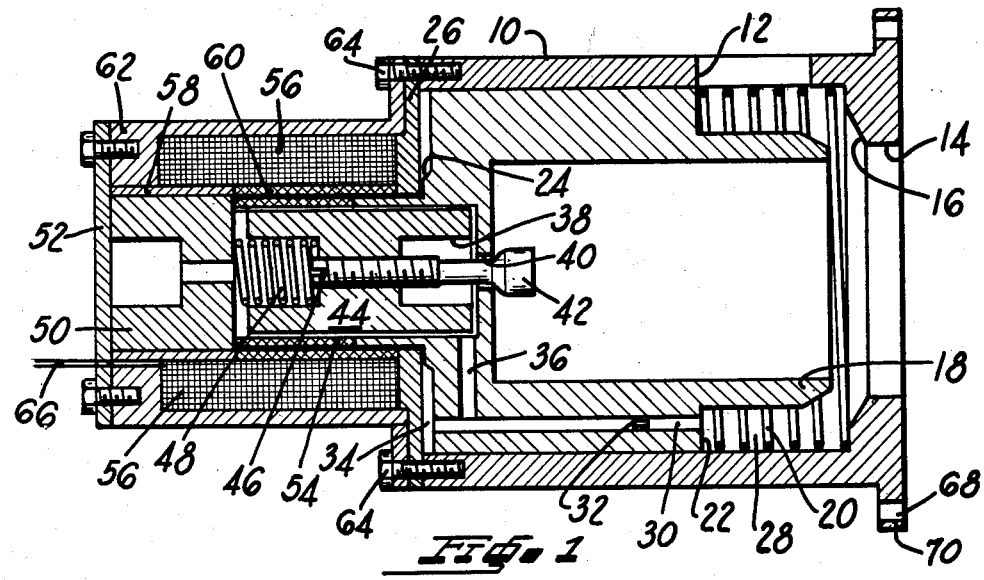
Figure 2:
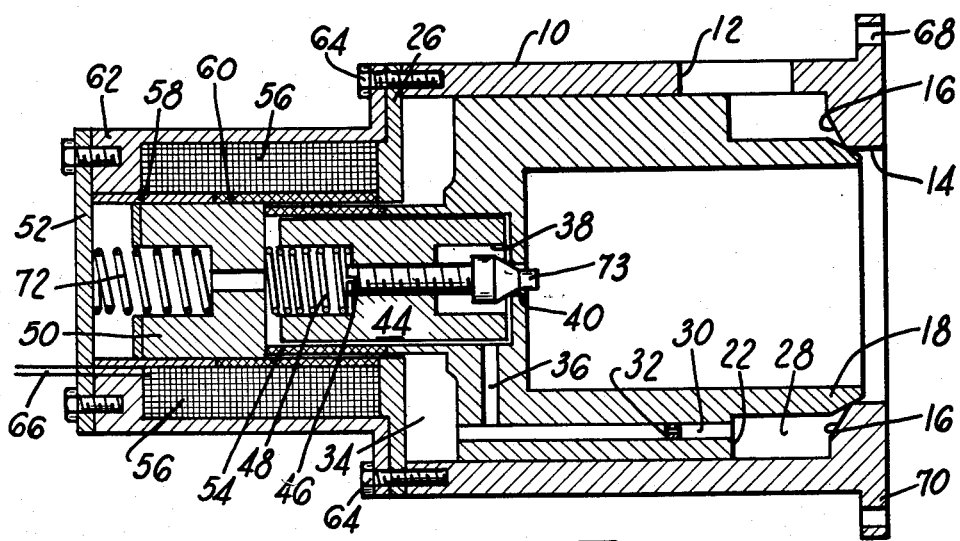

Other objects will become apparent from the following specification and drawings in which:

FIGURE 1 is a sectionl view of a normally-open configuration of pilot type solenoid operated valve incorporating our invention; and FIGURE 2 is a sectional view of a pilot type solenoid operated valve having a normally-closed configuration.

Referring now to FIGURE 1, numeral 10 is a housing having a fluid inlet port 12 and a fluid outlet port 14. Formed as part of housing 10 is a valve seat 16 adapted to mate with a piston and valve member 18 adapted to reciprocate in the hollow interior of housing 10. A spring 20 acts against a shoulder 22 of valve member 18 thus urging valve member 18 toward the left in an opening direction. Valve member 18 also carries another shoulder section 24 which abuts against an end plate member 26 forming part of housing 10. In communication with inlet port 12 is a chamber 28 which contains spring 20 and which communicates through a conduit 30 and a bleed 32 with a chamber 34 at the left end of the piston and valve member 18. Intersecting conduit 30 is a conduit 36 which communicates with the chamber 38 and an orifice 40, communication through which is controlled by means of a pilot valve 42. Valve member 42 is threadedly engaged with a solenoid armature member 44 and includes a screw driver slot 46 which permits adjustment of the position of valve member 42 with respect to the orifice 40. A spring member 48 urges the armature member 44 and the valve member 42 toward the right thus making the pilot valve normally open. The opposite end of spring member 48 abuts against a soft iron pole piece 50 which is held in position against the force of spring 48 by means of an end plate 52.

The armature member 44 reciprocates within a cylindrical extension of the piston and valve member 18 having a section thereof 54 which is formed of non-magnetic material, preferably some form of non-magnetic stainless steel.

The armature winding 56 is wound on a coil form member 58 including a non-magnetic portion 60 which abuts against the end plate member 26. Also forming part of the magnetic circuit around the winding 56 is a cylindrical member 62 forming part of the housing for the entire unit and which is attached to the member 10 by means of bolts 64. The winding 56 receives its energy from an electrical source (not shown) through a pair of wires 66. The entire unit is bolted to a bulkhead or other housing by means of bolts fastened through bolt holes 68 formed in a flange 70.

The valve assembly described above is adapted to be connected to a source of high pressure fluid connected with port 12 and a source of lower pressure fluid or drain pressure connected with port 14. In the normally open form shown in FIGURE 1, the fluid flows directly across the valve orifice and seat 16 and also into channel 30, across bleed 32, and into the chamber 34. At the same time it also flows through conduit 36 and across orifice 40, past valve member 42 and into the hollow interior of piston and valve member 18 where it is in communication with the low pressure fluid downstream from outlet port 14. Under these conditions, the relatively high fluid pressure acting against shoulder 22 added to the force exerted by the spring 20 exceeds the force acting in chamber 34 against the left end of member 18 and the valve is held open. There is a continual flow of fluid across the orifice 40 and chamber 34 is, therefore effectively in communication with the low fluid pressure downstream of port 14. When the winding 56 is energized, a magnetic field is set up in the magnetic material around the winding including plate 26, members 62 and 58, pole piece 50, and the armature 44. The non-magnetic portions 60 and 54 are provided for the purpose of insuring that the solenoid member 44 remains as part of the magnetic circuit and that the lines of force are not short circuited as would be the case if these portions were of magnetic material. This magnetic circuit causes lines of force to flow across the air gap on the left end of armature 44 and causes this armature to be moved in a direction to close this air gap between itself and pole piece 50 against the force of spring 48, which is comparatively weak. As armature 44 moves to the left, it carries valve member 42 with it thereby closing orifice 40 and causing a substantial increase in the fluid pressure acting in chamber 34 against the large area or wall on the left end of member 18. The force in chamber 34 thus becomes sufficient to overcome the fluid pressure and spring forces acting against the shoulder 22 and the valve member 18 is moved to the right in a closing direction. As member 18 moves it carries with it the cylindrical extension and the non-magnetic section 54, the pole piece 50, the armature 44, the spring 48 and the valve member 42. Thus it will be seen that the travel of the valve member 42 is entirely independent of the travel of valve member and piston 18. By removing the end plate 52, a screwdriver adjustment can be effected on valve 42 to control its effective travel.

The device shown in FIGURE 2 is very similar to that of FIGURE 1 except that some of the parts are modified and rearranged to make the FIGURE 2 device operate as a normally closed solenoid operated valve member. Insofar as the parts are identical with those of FIGURE 1, they have been given the same numbers in the device of FIGURE 2. It will be observed that most of the parts shown are, or may be, identical with those shown in FIGURE 1. The spring 20 shown in FIGURE 1 is not used in the FIGURE 2 modification inasmuch as it is desired that the high pressure fluid in chamber 28 communicating through conduit 30 and bleed 32 with chamber 34 be effective in chamber 34 to hold valve member 18 on its seat 16 during the time that the solenoid is not energized. Instead of spring 20, a spring 72 is positioned between a hollow cylindrical portion of the pole piece 50 and the end plate 52 and urges the pole piece 50, the armature 44, the valve member 18 and the associated structure toward the right. It will also be observed that the pilot valve 73 of the FIGURE 2 modification is contoured opposite to that of the FIGURE 1 modification, i.e., movement toward the right closes the orifice 40 and movement toward the left opens orifice 40. As in the FIGURE 1 version, removal of the end plate 52 permits a screwdriver adjustment of the valve member 73 entirely independently of the travel of member 18.

Operation of the FIGURE 2 modification assumes connections with sources of low and high pressure fluid and connections with a bulkhead as set forth above with regard to FIGURE 1. When the solenoid is de-energized, high pressure fluid is supplied to chamber 28 and in this chamber it acts against the shoulder 22. It is also supplied through conduit 30 and bleed 32 to the chamber 34 where it acts upon a much larger area on the left end of piston and valve member 18. A conduit 36 provides communication to the upstream side of orifice 40, but this orifice is held closed by valve member 73 which is urged toward the right through the action of the spring 48. Consequently, the high pressure acting on shoulder 22 is insufficient to overcome the pressure acting in chamber 34 plus the force exerted by spring 72 and the control valve member 18 is held on seat 16. When the solenoid winding 56 is energized, magnetic lines of force cross the air gap on the left end of the armature 44 causing said armature to be moved to the left thus moving valve member 73 to the left and opening orifice 40. The fluid pressure acting in chamber 34 is quickly exhausted through conduit 36 and orifice 40 and the higher pressure acting against the shoulder 22 is thus enabled to move member 18 in an opening direction. As member 18 moves to the left, it carries with it the armature 44, the non-magnetic extension 54, the pole piece 50, and the valve member 73. Again it will be observed that this arrangement permits the operation of the pilot valve member 73 to be entirely independent of the member 18 both as to the force required to operate the valve member and its effective travel.

Although only two embodiments have been shown and described herein, it will be apparent to those skilled in the art that modifications can be made to suit the requirements of any given application without departing from the spirit and scope of the invention. The relative sizes of the working areas on each end of the piston and the strength of the spring holding the control valves open will depend on the fluid pressures encountered.

We claim:

1. A fluid pressure control device comprising a housing having a hollow cylindrical chamber, a plate of magnetic material substantially closing one end of said chamber, and an inlet port in said housing connected with a source of fluid under pressure, an outlet port at the opposite end of said chamber connected to a source of lower fluid pressure, a valve seat in said housing, a piston having a wall substantially closing one end and a shoulder of smaller effective area on the opposite end adjacent said inlet port reciprocable in said chamber including a valve member movable with said piston adapted to engage said valve seat, a spring in said chamber acting against said shoulder to urge said valve member away from said seat, a cylindrical extension of said piston attached to said wall including a cylindrical section of non-magnetic material and a portion of magnetic material, a coil and a coil form member including a cylindrical section of non-magnetic material concentrically positioned outside of said extension, an orifice in said wall and a pilot valve member adapted to control the flow through said orifice, an armature reciprocable in said extension threadedly engaged with said pilot valve member, a pole piece abutting against said extension, a resilient member positioned between said pole piece and said armature urging said pilot valve member toward its open position, a conduit providing communication between said inlet port and the outside of said wall, a restriction in said conduit, and a second conduit communicating said first conduit downstream of said restriction with said orifice, whereby energizing of said coil creates a magnetic circuit linking said housing exterior of said coil, the magnetic portion of said cylindrical extension, said armature and said pole piece and causes said armature to move in a direction to close said orifice, permitting the fluid pressure on the outside of said wall to increase and move the piston and thus moving the valve member against its seat and carrying said armature, pilot valve, pole piece and resilient member the entire length of its travel.

2. A fluid pressure control device comprising a housing having a hollow cylindrical chamber, a plate of magnetic material substantially closing one end of said chamber and an inlet port in said housing connected with a source of fluid under pressure, an outlet port at the opposite end of said chamber connected to a source of lower fluid pressure, a valve seat at said outlet port, a piston having a wall substantially closing one end and a shoulder of substantial effective area but less area than said wall on the opposite end adjacent said inlet port reciprocable in said housing parallel to the axis thereof and a valve member forming part of said piston adapted to engage said valve seat, a cylindrical extension of said piston attached to said wall including a cylindrical section of non-magnetic material and a portion of magnetic material, a coil and a coil form member including a cylindrical section of non-magnetic material concentrically positioned in said housing outside of said extension, an orifice in said wall and a pilot valve member adapted to control the flow through said orifice, an armature reciprocable in said extension threadedly engaged with said pilot valve member, a pole piece abutting against said extension, a resilient member positioned between said pole piece and said armature urging said pilot valve member in the opposite direction from its direction of movement when said coil is energized, a conduit providing communication between said inlet port and the outside of said wall, a restriction in said conduit, and a second conduit communicating said first conduit downstream of said restriction with said orifice, whereby energizing of said coil creates a magnetic circuit linking said housing exterior of said coil, the magnetic portion of said cylindrical extension, said armature and said pole piece and causes said armature to move said pilot valve thus varying the pressure drop across said wall and causing said piston to move and carry said armature, pilot valve, pole piece and resilient member the entire length of its travel.

3. A fluid pressure control device as set forth in claim 2 wherein said resilient member urges said pilot valve member toward its closed position and energizing of said coil causes said armature to move said pilot valve in a direction to open said orifice, thereby reducing the pressure on the outside of said wall and permitting the fluid pressure acting on said shoulder to move said piston, thus moving the valve member off its seat.

References Cited in the file of this patent

UNITED STATES PATENTS 2,496,553     Littlefield _____ Feb. 7, 1950

FOREIGN PATENTS 118,189     Sweden _____ Feb. 18, 1947
832,537     Great Britain _____ Apr. 13, 1960

OTHER REFERENCES

Bamag, German application 1,068,525, Nov. 5, 1959.